United States Patent [19]

Smith

[11] 4,171,084

[45] Oct. 16, 1979

[54] CLOSURE ASSEMBLY AND CONTAINER SEALED THEREWITH

[75] Inventor: Ernest L. Smith, Kansas City, Mo.

[73] Assignee: Phillips Petroleum Company, Bartlesville, Okla.

[21] Appl. No.: 926,600

[22] Filed: Jul. 21, 1978

[51] Int. Cl.² .................. B65D 53/04; B65D 53/06; B65D 5/02
[52] U.S. Cl. ................................ 229/43; 229/5.5; 229/5.7; 220/359; 215/232
[58] Field of Search ............... 229/4.5, 5.5, 5.6, 5.7, 229/43; 220/258, 359; 215/350; 113/120 XY, 120 Y, 121 A, 121 C

[56] References Cited
U.S. PATENT DOCUMENTS

| | | | |
|---|---|---|---|
| 2,181,545 | 11/1939 | Boothby et al. | 229/5.5 UX |
| 3,298,505 | 1/1967 | Stephenson | 229/43 X |
| 3,377,014 | 4/1968 | Röcher | 229/5.7 X |
| 3,547,338 | 12/1970 | Hemmes | 229/43 |
| 3,805,993 | 4/1974 | Enzie et al. | 220/359 X |
| 3,892,351 | 7/1975 | Johnson et al. | 229/43 |
| 3,973,719 | 8/1976 | Johnson et al. | 229/5.6 |
| 4,013,188 | 3/1977 | Ray | 215/232 |
| 4,044,941 | 8/1977 | Kudsen | 229/43 |

Primary Examiner—Davis T. Moorhead

[57] ABSTRACT

A hermetically sealed recloseable container is provided in which the closure is formed from a thermoplastic ring and an independent sheet-form member which is bonded to the ring and the upper end of the container such that when the closure is removed the sheet-form member will remain integral with the ring to provide a closure useful for reclosing the container. The method of forming such a sealed container is also provided.

16 Claims, 3 Drawing Figures

CLOSURE ASSEMBLY AND CONTAINER SEALED THEREWITH

This invention relates to hermetically sealed containers. In another aspect this invention relates to a closure assembly for use in forming a hermetically sealed container. In yet another aspect this invention relates to a method of producing a hermetically sealed container.

Hermetically sealed containers help both to maintain the freshness of container contents and to provide the customer with a means of detecting whether or not the container has been opened since it was first sealed. The most common method of providing hermetically sealed containers involves the use of a sheet-form member which is sealed to the rim which surrounds the opening in the upper end of the container. Since such sheet-form members are not suitable for reclosing the container after it has been opened, it has been common to employ with such sheet-form closure members an overcap which is used to reclose the container after the sheet-form closure has been removed.

An object of the present invention is to provide a closure assembly in which the sheet-form member used to provide a hermetic seal serves as an integral portion of the closure for reclosing the container.

Another object of the present invention is to provide a hermetically sealed recloseable container without the necessity of using both a sheet-form closure and an overcap.

Accordingly an object of the present invention is to provide a means of forming hermetically sealed recloseable containers using less materials than required in the production of many previously produced such containers.

Still other aspects and objects of the present invention will be apparent from the following disclosure and the accompanying drawings.

In accordance with the present invention there is provided a sheet-form laminate adapted to rest upon the upper end of a container and cover the opening in the container. There is further provided a thermoplastic ring comprising a generally planar portion and a downwardly depending skirt adapated to fit around the outside of the container. The generally planar portion of the thermoplastic ring is adapted to rest upon the perimeter of the upper surface of the laminate. The laminate has on its upper surface, at least in the area where the ring will rest, a first coating of thermoplastic material and on its bottom surface, at least in the area that will rest on the upper end of the container, a second coating of a thermoplastic material. The laminate further includes a base material separating the first coating and the second coating.

Further in accordance with the invention there is provided a container which is hermetically sealed with a container closure assembly as above described in such a fashion that the generally planar portion of the ring of the closure assembly is melt bonded to the first coating of thermoplastic of the sheet-form laminate and the rim of the container is melt bonded to the second coating of the laminate. The bonds of such second and first coatings in the sealed container are such that when the ring is removed from the container the bond between the second coating and the rim will break while the bond between the first coating and the thermoplastic ring maintains its integrity to provide a unitary recloseable closure.

Still further in accordance with this invention there is provided a method for producing a hermetically sealed recloseable container as just described comprising applying the inventive closure assembly to the container and heating the closure assembly such that this above-described bonds are formed.

The instant invention is considered applicable for sealing generally any form of container that has an opening in its upper end. The invention is particularly applicable for sealing containers in which the sidewall is constructed of paperboard, the upper end of which includes a rim that is coated with a thermoplastic.

The thermoplastic ring can be constructed of any suitable material. In a preferred embodiment the ring is formed from a plastic such as polyethylene by some type of forming operation such as injection molding or thermoforming.

The base material for the sheet-form laminate can be constructed of any suitable material. Any material is suitable which will permit bonding of the closure in the manner described above. The choice of material for the base material and its thickness will of course be somewhat dependent upon what method is used to heat the closure assembly to obtain the described effect. For example, the base material must be capable of retaining its shape when exposed to the heat required for forming the inventive sealed container.

The first and second coatings of thermoplastic of the sheet-form laminate can be the same or different. If the coatings are of the identical material it is necessary to heat the first coating to a higher temperature than the second in order to obtain a sealed container in which the bond of the second coating to the rim will break before the bond of the first coating to the ring. Typical coatings include thermoplastic adhesives such as set forth in Table I.

|  | Melting Point Range °F. |
| --- | --- |
| Thermoplastic Adhesives |  |
| Paraffin wax | 125–185 |
| Paraffin wax mixtures with microcrystalline wax and butyl rubber elastomer | 135–195 |
| Microcrystalline wax | 135–195 |
| Wax mixtures with addition of plasticizers, polymers, resins, metallic soaps and dyes | 125–195 |
| Low molecular weight polymers | 150–400 |
| Thermo plastic lacquers | 120–350 |
| Thermo plastic resins | 120–350 |
| Thermo plastic natural gums | 110–300 |

In a preferred embodiment the thermoplastic coating used for the first coating comprises a material which has greater inherent strength than the material used in the second coating. For example, the first coating is a low density polyethylene and the second coating a microcrystalline wax. Since it is known to compound hot melt adhesives of different strengths, another suitable combination would be a first coating of a high strength hot melt adhesive and the second coating of a low strength hot melt adhesive.

The heating necessary to form the inventive sealed container can be carried out in any suitable manner. For example, if the sheet-form laminate includes a suitable electrically conductive means the closure assembly can be applied to the container and imposing an electrical current in the electrically conductive means by induction to heat the first and second coatings. Another technique involves applying the closure assembly to the container and then apply ultrasonic vibrations to the closure assembly in the area above the rim of the container. Still another technique involves applying the closure assembly and then applying infrared heat to the upper surface of the closure assembly in the area above the rim of the container. It is further possible to heat the second coating by infrared or by narrowly directed jets of steam, then apply the sheet-form laminate, then heat the first coating by infrared or steam, and then apply the thermoplastic ring. Other techniques will be readily obvious to one skilled in the art having the benefit of this disclosure teaching of the results to be achieved.

A further understanding of the instant invention will be provided by referring to the attached drawings which illustrate a preferred embodiment of the instant invention. In the drawings.

In the drawings identical numerals refer to like parts wherever they occur.

Figure 1:
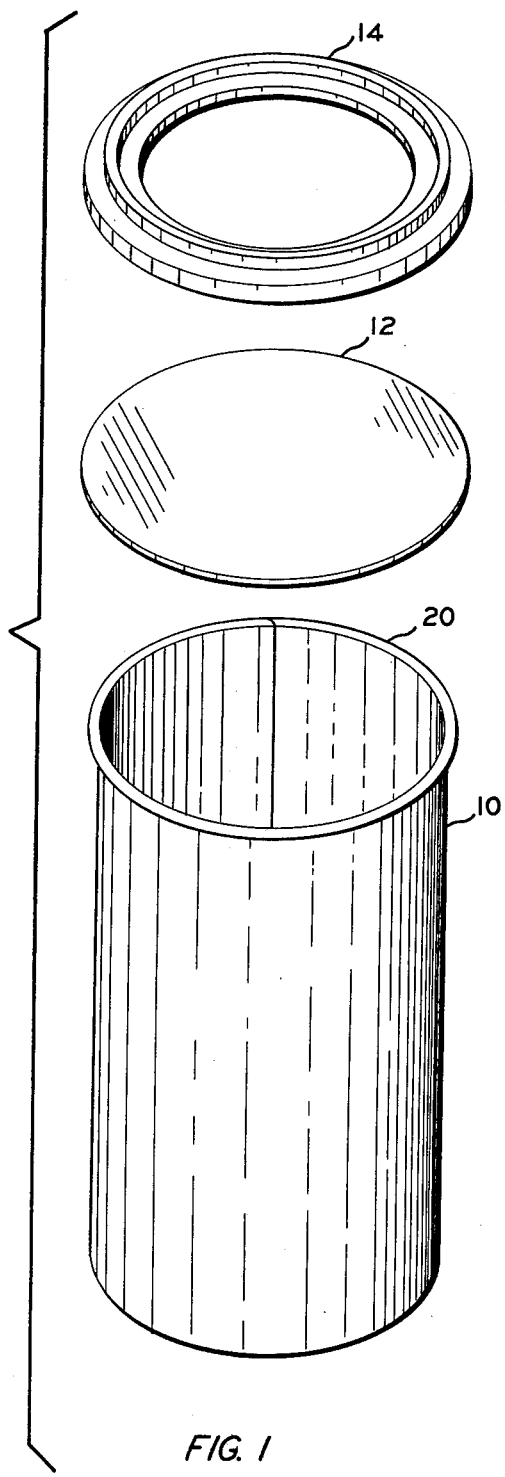
FIG. 1 is an exploded perspective view of a closure assembly of the invention and a conforming container which can be sealed therewith.

Now referring to FIG. 1 in detail, there is illustrated a container 10, a sheet-form laminate 12, and a thermoplastic ring 14.

Figure 2:
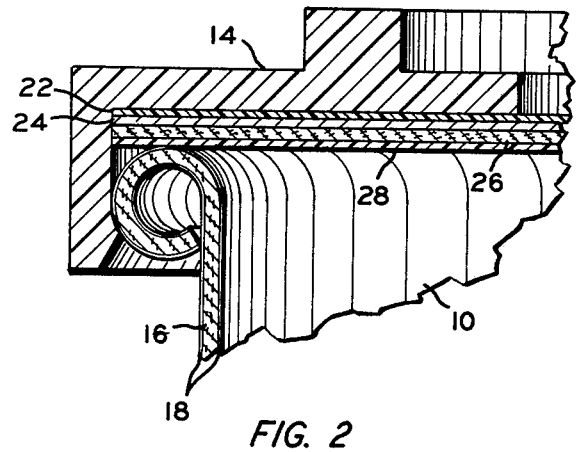
FIG. 2 is a fragmentary cross-sectional view illustrating a preferred closure assembly applied on a preferred type of container.

The container 10 illustrated is of the type having a cylindrical sidewall formed from a flat paperboard blank that has been folded such that one side margin coverlaps the other side margin. Methods of preparing such containers are well known in the art. As illustrated in FIG. 2 the container sidewall comprises a laminate of paperboard having a coating of thermoplastic 18 on both surfaces. Generally the thickness of the paperboard in such containers is in the range of about 10 to about 40 mils preferably from about 14 to 22 mils and the thickness of the coatings 18 is in the range of about 0.00015 to about 0.001 inch. The upper end of the container sidewall is rolled outwardly to provide an outwardly extending rim 20.

The sheet-form laminate 12 is in the form of a disk. As illustrated in FIG. 2 the laminate 12 comprises a first thermoplastic coating 22, a metal foil layer 24, a paperboard layer 26, and a second thermoplastic coating 28. Generally in this preferred embodiment the paperboard layer 26 will have a thickness in the same range as that set forth for the container sidewall. Further, in this preferred embodiment the metal foil will have a thickness in the range of about 0.0001 to about 0.001 inch. For example, a suitable thickness for the first coating is 0.0002 inch, 0.0005 for the second coating, 0.00035 inch for the foil, and 0.016 inch for the paper.

Using a preferred method for forming a hermetically sealed recloseable container, after the closure assembly is placed upon the container as illustrated in FIG. 2, the metal foil is heated by a suitably positioned energizing electrode until the coatings 22 and 28 have been melted sufficiently to provide bonds suitable for achieving the herein described objects. The use of induction heating to provide heat sealing of containers is described in more detail in U.S. Pat. No. 3,892,351.

After the induction heating is discontinued and the sealed container allowed to cool to room temperature one then has a hermetically sealed container in which the sheet-form closure 12 remains integral with thermoplastic ring 14 after the container has been opened so that the integral closure can be used for reclosing the container.

Figure 3:
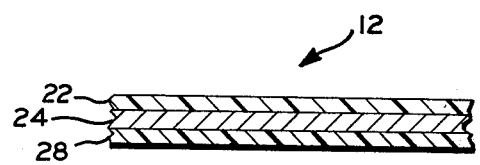
FIG. 3 is a fragmentary cross-sectional view of an alternate type of sheet-form laminate that can be employed in the instant invention.

It is however, within the scope of this invention to employ a laminate such as illustrated in FIG. 3 wherein the paperboard is not used. In this instance the laminate consists of coatings 22 and 28 on each side of a foil member 24. A suitable foil member would be 0.004 inch thick. Generally the foil thickness will be in a range from 0.001 to 0.006 inch. Generally, when such a laminate is used in the inductive heating method above discussed, the coatings 22 and 28 must be of different materials in order to achieve the bonds of different strengths described heretofore.

From the foregoing description one skilled in the art can easily ascertain the essential characteristics of this invention and without departing from the spirit and scope thereof, can make various changes and modifications of the invention to adapt it to various usages and conditions. Accordingly, it is noted that while the invention has been described above in detail in regard to a particular preferred embodiment, the invention is not intended to be limited to that embodiment. It is intended to include within the scope of the claims all embodiments which employ the benefit of the essence of this invention.

I claim:

1. A closure assembly comprising a sheet-form laminate adapted to rest upon the upper end of a conforming container and cover the opening therein and a thermoplastic ring comprising a generally planar portion and a downwardly depending skirt adapted to fit around the outside of a conforming container, wherein said generally planar portion of said ring is adapted to rest upon the perimeter of the upper surface of said laminate, wherein said laminate has on its upper surface at least in the area where the generally planar portion of the ring will rest thereon a first coating of a thermoplastic material and on its bottom surface at least in the area where the sheet-form member rests upon the upper end of the container a second coating of a thermoplastic material, and wherein said laminate includes a base material separating said first coating and said second coating.

2. A closure assembly according to claim 1 wherein the base material of said sheet-form laminate is paperboard.

3. A closure assembly according to claim 2 wherein said laminate includes a layer of metal foil between said first coating and said paperboard.

4. A closure assembly according to claim 3 wherein said paperboard has a thickness in the range of about 10 to about 40 mils and said metal foil has a thickness in the range of about 0.0001 to about 0.001 inch.

5. A closure assembly according to claim 1 wherein the base material of said sheet-form member is metal foil.

6. A closure assembly according to claim 5 wherein the metal foil has a thickness in the range of about 0.001 to about 0.006 inch.

7. A hermetically sealed recloseable container comprising (1) a container portion the upper end of which comprises an opening and a rim surrounding said opening and (2) a conforming closure comprising a closure assembly according to claim 1 which has been applied to the upper end of said container portion and subjected to heating such that said first coating of thermoplastic material is melt bonded to said generally planar portion of said thermoplastic ring and said second coating of thermoplastic material is melt bonded to the said rim so that upon removing said closure from said container the bond between the second coating and said rim will break while the bond between the first coating and said thermoplastic ring is maintained so that said ring and said sheet-form laminate remain as a unitary recloseable closure.

8. A hermetically sealed recloseable container according to claim 7 wherein said container portion comprises a sidewall of paperboard and said rim comprises an outwardly rolled portion of the upper end of said sidewall and wherein said rim has a coating of thermoplastic on the upper surface thereof.

9. A hermetically sealed recloseable container according to claim 8 wherein the base material of said sheet-form laminate of said closure is paperboard and wherein said laminate includes a layer of metal foil between said first coating and said paperboard.

10. A hermetically sealed recloseable container according to claim 9 wherein the coating of thermoplastic on the rim has a thickness in the range of about 0.0001 to about 0.001 inch, and wherein the thickness of the paperboard of said sidewall is in the range of about 10 to about 40 mils.

11. A hermetically sealed recloseable container according to claim 8 wherein the base material of said sheet-form laminate of said closure is metal foil.

12. A hermetically sealed recloseable container comprising (1) a container portion, the upper end of which comprises an opening and a rim surrounding said opening and (2) a conforming closure comprising a closure assembly according to claim 1 wherein the generally planar portion of the ring of said closure assembly is melt bonded to said first coating of thermoplastic material and wherein said rim is melt bonded to said second coating of thermoplastic material and wherein the bond between the second coating and said rim will break upon separation of the ring from the container while the bond between the first coating and said thermoplastic ring is maintained such that said sheet-form laminate and said ring remain as a unitary closure which can be used to reclose said container portion.

13. A hermetically sealed recloseable container according to claim 12 wherein said container portion comprises a sidewall of paperboard and said rim comprises an outwardly rolled portion of the upper end of said sidewall and wherein said rim has a coating of thermoplastic on the upper surface thereof.

14. A hermetically sealed recloseable container according to claim 13 wherein the base material of said sheet-form laminate of said closure is paperboard and wherein said laminate includes a layer of metal foil between said first coating and said paperboard.

15. A hermetically sealed recloseable container according to claim 14 wherein the coating of thermoplastic on the rim has a thickness in the range of about 0.0001 to about 0.001 inch, and wherein the thickness of the paperboard of said sidewall is in the range of about 10 to about 40 mils.

16. A hermetically sealed recloseable container according to claim 13 wherein the base material of said sheet-form laminate of said closure is metal foil.

* * * * *